R. SERA.
TIRE.
APPLICATION FILED SEPT. 13, 1920.
1,380,501.
Patented June 7, 1921.
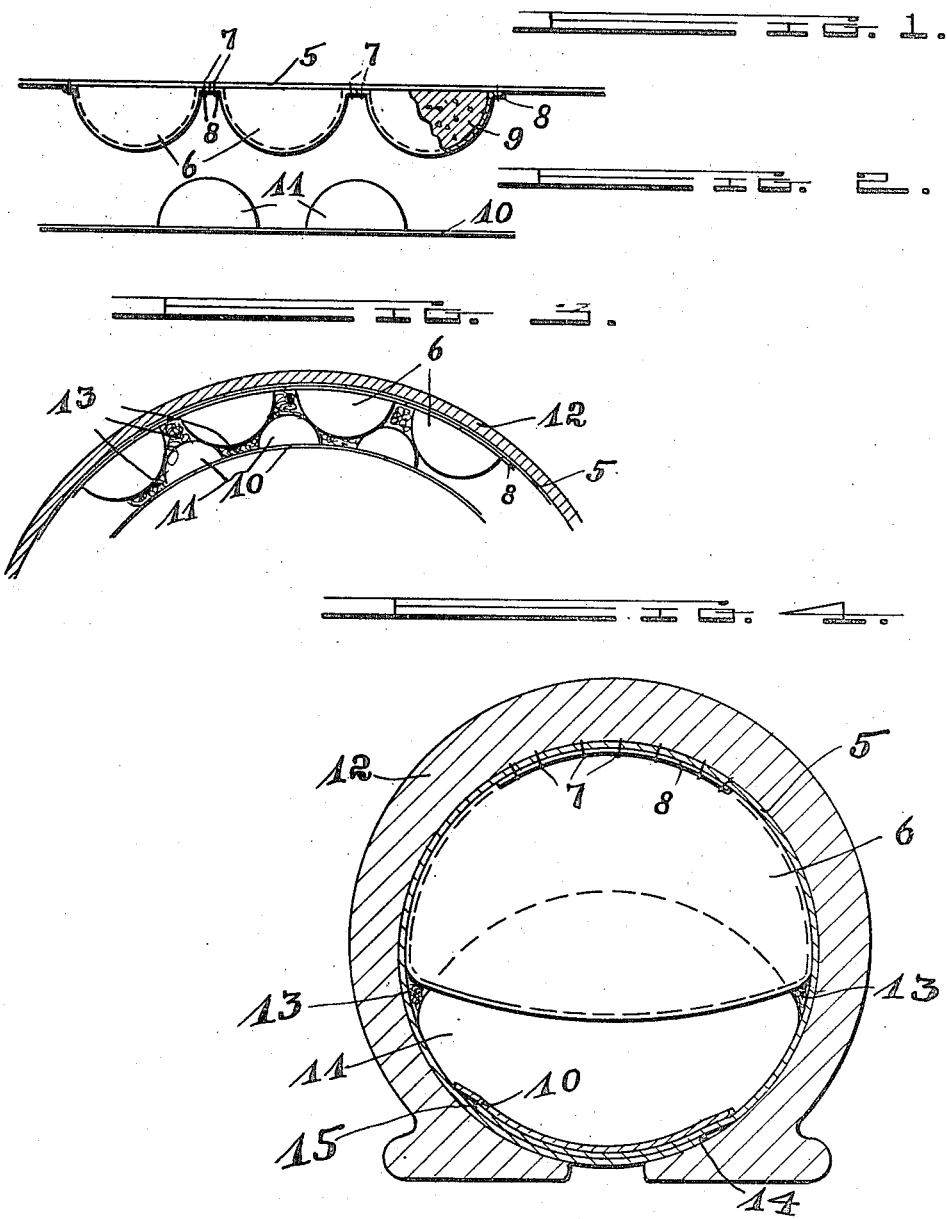
INVENTOR:
Ryumatsu Sera,
By: Edward M. Fujima
ATTORNEY.

UNITED STATES PATENT OFFICE.

RYUMATSU SERA, OF LOS ANGELES, CALIFORNIA.

TIRE.

1,380,501.  Specification of Letters Patent.  Patented June 7, 1921.

Application filed September 13, 1920. Serial No. 409,782.

*To all whom it may concern:*

Be it known that I, RYUMATSU SERA, a subject of the Emperor of Japan, residing at Los Angeles, in the county of Los Angeles and State of California, have invented a new and useful Tire, of which the following is a specification.

This invention relates to tires for vehicle-wheels, and more particularly to tire constructions used in combination with so-called tire-casings.

One of the objects of this invention is to eliminate pneumatic tires.

Another object is to provide a cheap, inexpensive and easily arrangeable filling to be used within tire-casings.

Other objects will appear from the following description and appended claims as well as from the accompanying drawing, in which—

Figure 1 is a fragmentary side elevation of a strap to which a suitable number of pads are secured to fill a tire-casing to some extent through the whole circle, portions of this member being shown in midsection to disclose the filling of the pads.

Fig. 2 is a fragmentary side elevation of another strap to which a corresponding number of elastic members are secured to fit between the pads when arranged within a tire-casing in combination with the padded strap.

Fig. 3 is a fragmentary vertical longitudinal section through a tire-casing with the two straps arranged within such casing.

Fig. 4 is a cross sectional view of the tire construction in enlarged scale.

Similar numbers refer to similar parts throughout the several views.

The strap 5 is preferably secured to the pads 6 as indicated at 7, by sewing, stitching, riveting, or other similar means. Each pad is filled with sawdust and cork materials 9, sewed in so as to leave an edge on the pad, as indicated at 8, by which the pad can be attached to the strap 5. The strap 10 is provided with the rubber blocks 11, which are preferably glued to the strap 10.

Arranged within a tire-casing 12, the strap 5 is preferably placed nearest to the periphery of the casing, and the strap 10 nearest to a wheel felly, as will easily be understood from the illustration in Fig. 3. The rubber members 11 are so arranged within a tire-casing as to come between the pads 6. The space left between the pads and rubber members as well as within the casing as far as not filled by such pads and rubber members is filled up with asbestos, preferably as indicated at 13.

In the cross sectional view in Fig. 4, the illustration shows the strap 5 so wide as to entirely inclose the pads and the rubber members when disposed within the casing 12, the edges 14 and 15 of the strap 5 overlapping so far as to easily engage over the strap 10. This arrangement is for the purpose to make it easy to assemble the straps with the pads and rubber members and the asbestos filling to be inserted into the casing, as will easily be understood from the illustrations and the above description.

Having thus described my invention, I claim:

1. In a tire construction, a strap of fabric material having a number of rubber blocks secured to one side, and another strap having a corresponding number of pads secured to one side so as to engage between the blocks of the first-named strap when so disposed.

2. In a tire construction, in combination with a tire-casing, a strap of fabric, pads made of fabric, a filling of sawdust and cork disposed in the pads, the pads sewed to the strap in spaced relation one to the other, a second strap, a number of rubber blocks secured to the second-named strap in a similarly spaced relation as the pads on the first-named strap, the two straps disposed in the tire-casing so that the second-named strap with the rubber comes into a position to encircle the felly of a wheel when the casing is so disposed and bringing the second-named strap into a position as to encircle the first-named strap, the rubber blocks of the one strap located to engage between the pads of the other strap, the first-named strap having a width to engage the whole pads and the second-named strap with the rubber blocks overlapping over the first-named strap, and a filling of asbestos disposed between the pads and blocks and within the tire-casing.

In testimony that I claim the foregoing as my invention I have signed my name in presence of two subscribing witnesses.

RYUMATSU SERA.

Witnesses:
  HENRY S. HUKASAWA,
  SETSUZO UCHIDA.